United States Patent
Hsieh et al.

(10) Patent No.: US 11,613,471 B2
(45) Date of Patent: Mar. 28, 2023

(54) PREPARATION METHOD OF SIO2 AEROGELS

(71) Applicant: Kuo-Sheng Chao, Taixi Township (TW)

(72) Inventors: Ta-Hua Hsieh, Taixi Township (TW); Yi-Wen Chen, Tainan (TW)

(73) Assignee: Chao Kuo-Sheng, Taixi Township (TW)

( * ) Notice: Subject to any disclaimer, the term of this patent is extended or adjusted under 35 U.S.C. 154(b) by 27 days.

(21) Appl. No.: 17/189,560

(22) Filed: Mar. 2, 2021

(65) Prior Publication Data
US 2021/0269317 A1    Sep. 2, 2021

(30) Foreign Application Priority Data
Mar. 2, 2020  (TW) ................. 109106708

(51) Int. Cl.
C01B 33/158    (2006.01)
C01B 33/16     (2006.01)

(52) U.S. Cl.
CPC ........ C01B 33/1585 (2013.01); C01B 33/166 (2013.01); *C01P 2006/32* (2013.01); *C01P 2006/90* (2013.01)

(58) Field of Classification Search
CPC ............... C01B 33/1585; C01B 33/166; C01P 2006/32; C01P 2006/90
See application file for complete search history.

(56) References Cited

U.S. PATENT DOCUMENTS

| 9,216,909 B2  | 12/2015 | Fukuju et al. |
| 9,868,843 B2  | 1/2018  | Evans et al.  |
| 10,227,472 B2 | 3/2019  | Evans et al.  |
| 10,233,302 B2 | 3/2019  | Evans et al.  |

(Continued)

FOREIGN PATENT DOCUMENTS

| CN | 103818912 B | 10/2015 |
| CN | 104071797 B | 12/2015 |

(Continued)

OTHER PUBLICATIONS

JP2012091943A (Google Patents) (Year: 2012).*

*Primary Examiner* — Anthony J Zimmer
*Assistant Examiner* — Logan Edward Laclair
(74) *Attorney, Agent, or Firm* — Karin L. Williams; Alan D. Kamrath; Mayer & Williams PC

(57) ABSTRACT

A preparation method of $SiO_2$ aerogels is for solvent replacement process during preparation of $SiO_2$ aerogels and adopts "a manner of continuously circulation filtration" for an operation of adding solvent so that wet gel is continuously circulated and replaced (rinsing) by mass alcohol solvent and organic solvent to greatly accelerate (reducing) the time for replacement operation of wet gel solvent. At the same time, the alcohol solvent or the organic solvent passing through the reaction container separates wet gel from water content or the alcohol solution through filtration procedure. Afterward the alcohol solution and the organic solution enter the reaction container to perform solvent replacement such that fast continuously circulation filtration is performed to greatly improve the effect of replacing wet gel solvent.

10 Claims, 3 Drawing Sheets

(56) References Cited

U.S. PATENT DOCUMENTS

| | | |
|---|---|---|
| 10,233,303 B2 | 3/2019 | Evans et al. |
| 10,253,159 B2 | 4/2019 | Evans et al. |
| 10,377,637 B2 | 8/2019 | Sakatani et al. |
| 10,639,606 B2 | 5/2020 | Chen et al. |

FOREIGN PATENT DOCUMENTS

| | | | |
|---|---|---|---|
| CN | 104030301 B | | 3/2016 |
| CN | 105776234 A | | 7/2016 |
| CN | 106745000 A | | 5/2017 |
| CN | 100865558 A | | 6/2017 |
| CN | 109133070 A | | 1/2019 |
| JP | 2012091943 A | * | 5/2012 |

* cited by examiner

PREPARATION METHOD OF SIO2 AEROGELS

BACKGROUND OF THE INVENTION

Field of the Invention

The present invention relates to a preparation method of $SiO_2$ aerogels, and more particularly to the preparation method for solvent replacement process that adopts "a manner of continuously circulation filtration" for operation of adding solvent while preparing $SiO_2$ aerogels.

Description of the Related Art

Aerogels is a nano-porous network structure composed of mutually gathering nanoscale ultrafine particles and a lightweight nano-solid material that fully fills gaseous dispersion mediums within the network pores. The preparation methods for different aerogels may be different but its preparation procedures are similar. Usually, it adopts a sol-gel method to prepare a wet gel. The wet gel then is processed by solvent replacement and supercritical drying to obtain aerogel. The feature of aerogel is that: (a) high porosity: it can be around 99.8%; (b) nanoscale pores (2 to 50 nm) and three-dimensional nano-skeleton particles (2 to 5 nm); (c) high specific surface area: it can be around 1000 m·supra·2/g; (d) low density: it can be as low as 0.003 g/cm·supra·3; (e) extremely low thermal conductivity: it can be as low as 0.013 W/(mK) at room temperature and lower than thermal conductivity of air; (f) low strength and large brittleness: since its specific surface area and porosity are high and have low density to cause extremely low strength. Aerogel is a super adiabatic material in high-tech industry scope and applied in many industries. Mr. S. S. Kistler who had been taught in Stanford University firstly utilizes water glass to produce $SiO_2$ (SiO.sub.2) aerogels through the sol-gel method and supercritical drying technique, and the foregoing substance can be also called "silica aerogel".

A conventional preparation method of $SiO_2$ aerogels has many patents as prior arts registered in different countries, for example, U.S. Pat. No. 10,377,637B2 "Aerogel and manufacturing method thereof", CN103818912B "Method of preparing aerogel having low density and large specific surface area at normal pressure", CN105776234A "Supercritical drying method of purifying water glass aerogel using modified resin having sodium metaaluminate", CN106745000A "Preparation method of water glass base $SiO_2$ aerogels", CN106865558A "Method of preparing $SiO_2$ aerogels at atmospheric pressure and $SiO_2$ aerogels for obtaining the same", CN109133070A "Method of ultra-fast preparing $SiO_2$ aerogels at atmospheric pressure using water glass as raw material", CN104071797B "Method of preparing low density and large specific surface area $SiO_2$ aerogel coating at atmospheric pressure and room temperature using water glass", TWI561561 "Aerogel particles and preparation method thereof", TWI516447 "Aerogels and preparation method thereof", TWI588209 "Improved hydrophobic aerogel material".

In the foregoing prior arts, method of preparing different aerogels must be processed by two steps of "replacement" and "modification". Moreover, "replacement" can be firstly carried out, or "modification" can be firstly performed, and furthermore "replacement" and "modification" can be merged to perform., wherein U.S. Pat. No. 10,377,637B2 is that gel is performed with operation of "solvent replacement plus modification" for one to twelve hours at 55 degree Celsius through "n-hexane plus isopropanol plus Hexamethyldisiloxane"; and CN103818912B is that gel is performed with 3 times of water-bath replacement operation for 8 hours at 50 degree Celsius through "ethanol (or isopropanol, acetone)", and it is further performed with 2 times of water-bath modification operation for 8 hours at 50 degree Celsius through "n-hexane"; and CN104030301B is that gel is performed with solvent replacement operation for 3 hours at 40 degree Celsius through "ethanol (or propanol) plus sulfuric acid" and is further performed with solvent modification operation for 6 hours through "n-hexane plus Hexamethyldisilazane"; and CN105776234A is that gel is performed with solvent replacement operation for 8 to 24 hours at 50 to 70 degree Celsius through "ethanol" and is further performed with modification operation for 7 to 9 hours at 45 degree Celsius; and CN106745000A is that gel is performed with solvent replacement operation for 2 to 4 hours water bath at 45 degree Celsius through pH 6.5 ethanol (or propanol) and is further performed with modification operation for 12 hours at 50 to 70 degree Celsius through "n-hexane plus trimethylchlorosilane (10 to 60 mL)"; and CN106865558A is that gel is performed with modification operation for 1 to 6 hours through "n-hexane plus aminosilane" and is further performed with water bath operation for 6 hours stirring at 60 degree Celsius through "sulfuric acid or hydrochloric acid"; and CN109133070A is that gel is crushed and performed with "solvent replacement plus modification" operation at 40 degree Celsius through "deionized water (for 1 to 2 hours), ethanol (for 0.5 to 1 hours), a modifier (taking upper layers after standing for 0.5 to 1 hours) and n-hexane (for 20 to 40 minutes)"; and CN104071797B is that gel in a sealed container is performed with solvent replacement for 8 hours at 45 degree Celsius of water bath condition using "ethanol" and is further performed with modification operation at 45 degree Celsius of water bath condition through "n-hexane plus trimethylchlorosilane 20 mL/times", and each time is reacted for 2 hours and must carry out for 3 to 4 times; and TWI561561 uses "a mixed solution of ethanol and water" to wash aerogel particles and dry aerogel particles through high temperature vacuum way, and afterward a hydrophobicity modification operation is performed to raise the temperature of the mixed solution to vaporize organic solvent, and an acylation organic molecule is added to enable the acylation organic molecule to mutually react hydroxyl groups of the aerogel particles so that the aerogel particles produce hydrophobicity, and the solvent is scattered by hydrophobicity to avoid the aerogel particles from being broken; and TWI516447 is that gel is performed with solvent replacement operation for 24 hours at 50 degree Celsius through "ethanol plus n-hexane", and gel is further performed with modification operation for 24 hours at 50 degree Celsius through "n-hexane plus trimethylchlorosilane".

In the conventional preparation method of $SiO_2$ aerogels, both steps of "replacement" and "modification" operations are performed. Moreover, "replacement" can be firstly carried out, or "modification" can be firstly performed, and furthermore "replacement" and "modification" can be merged to perform. In any conventional preparation method of $SiO_2$ aerogels, "replacement" or "modification" or "replacement plus modification" adopts a manner of "container immersion". In another word, a reaction container, which is so called a function container, having proper volume is prepared. The reaction container can be sealed type or incompletely sealed type and depends upon property of organic solvent. Afterward the wet gel is placed in the reaction container, and a selected proper solvent is injected therein to perform anticipated "replacement" and "modification" operations, wherein "replacement" is extremely important thing due to longer time of "replacement", and mass solvents (the foregoing is called solvent replacement operation) may be applied. For replacement operation, it facilitates preparation of $SiO_2$ aerogels if its operation time can be reduced to improve replacement effect.

SUMMARY OF THE INVENTION

Upon the foregoing shortcomings, the inventor(s) provides an idea of improving "replacement" operation and deeply carries out research and development so as to create the disclosure.

Therefore, it is a primary objective of the present invention to provide a preparation method of $SiO_2$ aerogels capable of greatly accelerating (reducing) replacement operation time of wet gel solvent.

Another objective of the present invention is to provide a preparation method of $SiO_2$ aerogels capable of greatly improving replacement effect.

A further objective of the present invention is to provide a preparation method of $SiO_2$ aerogels that is conveniently recycled and reused to achieve efficacies of saving expenses, environmental friendly and energy saving.

To achieve the above-mentioned objective, the present invention is to provide a preparation method of $SiO_2$ aerogels comprising the following steps:
(1). Mixing inorganic silicon source with pure water in a container to form a mixed solution;
(2). Performing hydrolysis for the mixed solution via cation exchange resin to obtain a silicic acid solution;
(3). Adding alkaline catalyst into the silicic acid solution to obtain a wet gel;
(4). Crushing the wet gel;
(5). Adding alcohol solvent into the crushed wet gel to perform aging for one to twelve hours;
(6). Performing solvent replacement for the aged wet gel, wherein the solvent replacement is divided into two stage operations, and the first stage is to place the aged wet gel in a reaction container added with the alcohol solvent, and water content within pores of the wet gel is exchanged out through the alcohol solvent; and the second stage is to add organic solvent in the reaction container having the wet gel after replacing with the alcohol solvent so as to exchange the alcohol solution within the pores of the wet gel;
(7). Carrying out surface modification for the wet gel that has been performed with solvent replacement, wherein a mixed solution having siloxane modifier and organic solvent is added into the container having the wet gel and organic solvent that are completed with solvent replacement so that the wet gel is modified into hydrophobicity from original hydrophilicity;
(8). Adopting atmospheric drying to dry the modified hydrophobic wet gel so as to prepare $SiO_2$ aerogels having low heat conductivity and high hydrophobicity; the characterized in that: in the step (6) of solvent replacement process, adopting "a manner of continuously circulation filtration" for operation of adding solvent, wherein a liquid inlet from a liquid pipe above the reaction container internally containing the wet gel communicates with the reaction container, and a bottom of the reaction container is disposed with a discharge pipe via a discharge outlet, and the discharge outlet is disposed with a filtration device, and the discharge pipe communicates with a solution storage tank, and a power source is disposed between the solution storage tank and the liquid pipe, and the power source has effect of sucking the discharge pipe and pushing the liquid pipe, and proper content solution is stored in the solution storage tank, and with effect of the power source, solution is circulated in the reaction container, the discharge pipe, the solution storage tank, the power source and the liquid pipe, and the water content (for the first stage) or the alcohol solution (for the second stage) contained within the wet gel is separated and removed.

According to the above-mentioned preparation method of $SiO_2$ aerogels, the sodium silicate (so called water glass) having 40 to 50 mass ratio of solid content in the step (1) is taken as the inorganic silicon source, and modulus of diluting sodium silicate through pure water is from 2.53 to 3.33, and the solid content is 8 to 20 percentage by weight.

According to the above-mentioned preparation method of $SiO_2$ aerogels, silicic acid solution having pH value:2 to 3 is obtained in the step (2), and more particularly to pH value: 2.4 to 2.6 as preferred.

According to the above-mentioned preparation method of $SiO_2$ aerogels, the alkaline catalyst in the step (3) is ammonium hydroxide (NH4OH) or sodium hydroxide (NaOH), and preferably 1M alkaline catalyst is added into the silicic acid solution until pH value of silicic acid is 4 to 8 so as to obtain the wet gel.

According to the above-mentioned preparation method of $SiO_2$ aerogels, a crusher preferably adopts rotation speed at 300~1000 rpm to crush in the step (4).

According to the above-mentioned preparation method of $SiO_2$ aerogels, the alcohol solvent in the step (5) is ethanol or isopropanol and methanol, and volume ratio of added the alcohol solvent and the silicic acid solution is 1:1 so that the crushed wet gel is aged for one to twelve hours at temperature of 25 to 80 degree Celsius.

According to the above-mentioned preparation method of $SiO_2$ aerogels, the alcohol solvent in the step (6) is ethanol, isopropanol or methanol, and the container having the wet gel is stirred for one to twelve hours at speed of 300 to 1000 rpm and temperature of 25 to 80 degree Celsius after adding the alcohol solvent, and an operation of replacing water content with the alcohol solvent is repeated for many times until a concentration of the alcohol solution is reduced to a set value, and the organic solvent is n-Hexane, acetone or cyclohexane, and a volume ratio of the organic solvent and silicic acid solution is 1:1, and the container having the wet gel is stirred for one to twelve hours at speed of 300 to 1000 rpm and temperature of 25 to 80 degree Celsius after adding organic solvent, and an operation of replacing the alcohol solvent with organic solution is repeated for many times until concentration of the organic solution is reduced to a set value.

According to the above-mentioned preparation method of $SiO_2$ aerogels, the mixed solution of adding a siloxane modifier and the organic solvent in the step (7) is stirred for one to sixteen hours at 25 to 80 degree Celsius and speed of 300 to 1000 rpm, and the siloxane modifier is Hexamethyldisilazane, Methyltrimethoxysilane or Tetraethyl orthosilicate, and Mole ratio of the siloxane modifier and the silicic acid is 1:0.35 to 1.67.

According to the above-mentioned preparation method of $SiO_2$ aerogels, the atmospheric drying in the step (8) respectively uses 60 degree Celsius, 150 degree Celsius and 230 degree Celsius to dry one hour by way of stepped heating.

According to the above-mentioned preparation method of $SiO_2$ aerogels, an external detection instrument is placed into solution contained in the solution storage tank to perform concentration detection.

The technical characteristics, contents, advantages and effects of the present invention will be apparent with the detailed description accompanied with related drawings of two preferred embodiments as follows.

DETAILED DESCRIPTION OF THE PREFERRED EMBODIMENTS

The technical characteristics, contents, advantages and effects of the present invention will be apparent with the detailed description accompanied with related drawings of preferred embodiments as follows.

Figure 1:
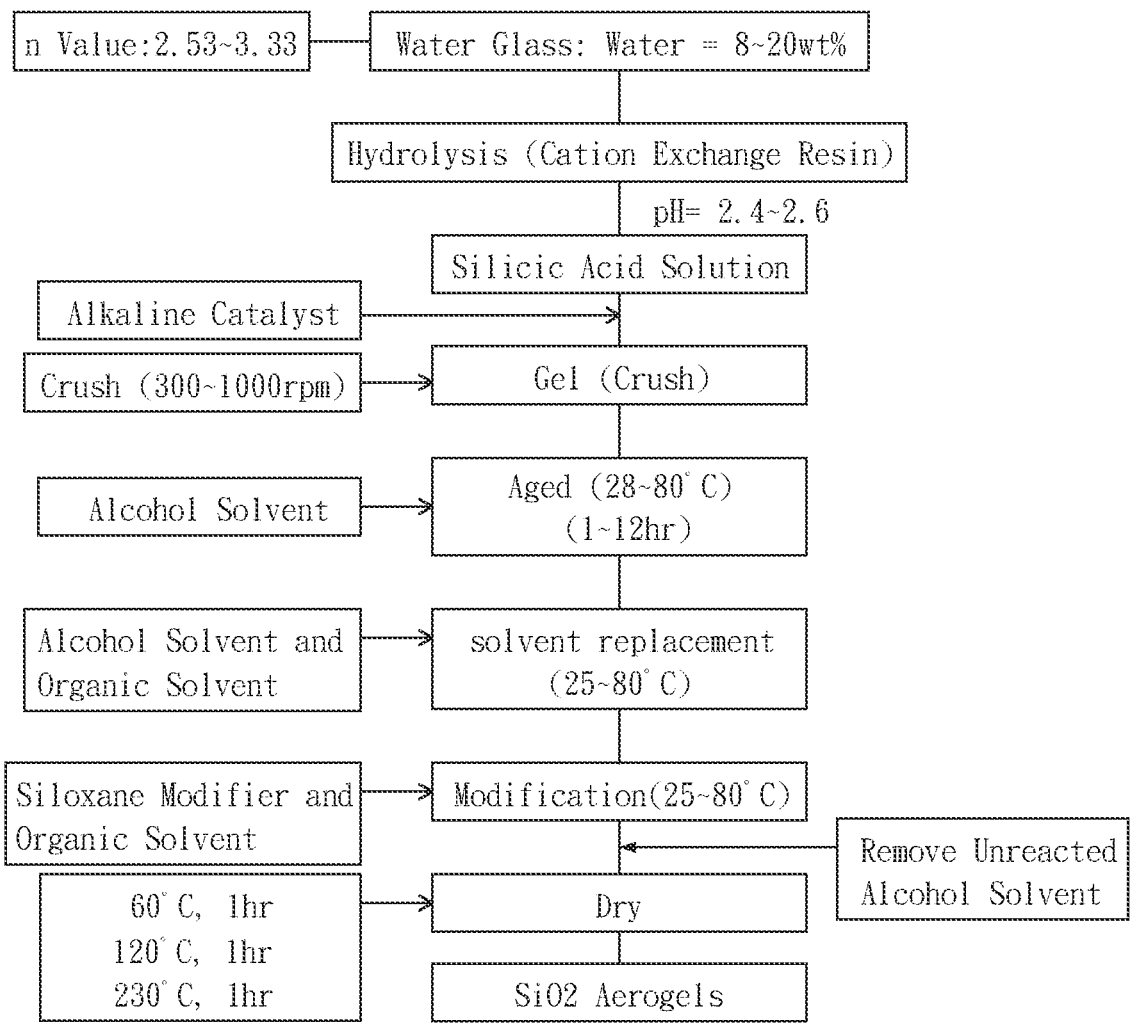
FIG. 1 is a step flow chart of preparing $SiO_2$ aerogels according to the invention.

With reference to FIG. 1 for a preparation method of $SiO_2$ aerogels mainly comprises the following steps:

(1) Inorganic silicon source and pure water are mixed in a container to form a solution. The sodium silicate (so called water glass) having 40 to 50 mass ratio of solid content is taken as the inorganic silicon source, and modulus of diluting sodium silicate through pure water is from 2.53 to 3.33, and the solid content is 8 to 20% percentage by weight.

(2) The mixed solution is performed with hydrolysis via cation exchange resin to obtain silicic acid solution at pH value: 2 to 3, and more particularly to pH value: 2.4 to 2.6 as preferred.

(3) Alkaline catalyst is added into the silicic acid solution to obtain a wet gel. The alkaline catalyst is ammonium hydroxide (NH4OH) or sodium hydroxide (NaOH), and preferably 1M alkaline catalyst is added into the silicic acid solution until pH value of silicic acid is 4 to 8 so as to obtain the wet gel.

(4) The wet gel is crushed, and the foregoing motion is carried out by a crusher preferably adopting rotation speed at 300~1000 rpm to crush.

(5) An alcohol solvent is added into the crushed wet gel, wherein the alcohol solvent is ethanol or isopropanol and methanol, and volume ratio of added the alcohol solvent and the silicic acid solution is 1:1 so that the crushed wet gel is aged for one to twelve hours at temperature of 25 to 80 degree Celsius.

Figure 2:
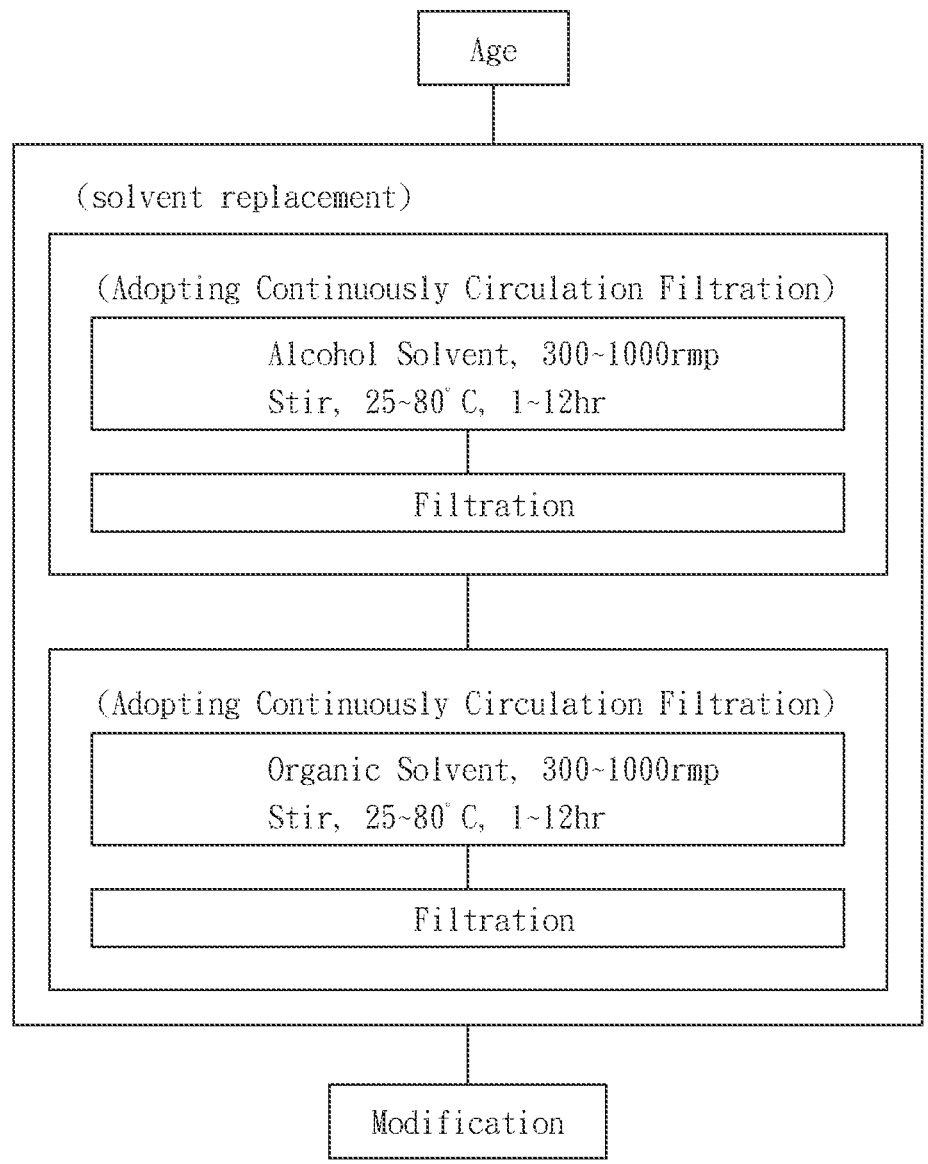
FIG. 2 is a step flow chart of solvent replacement operation in the preparation method according to the invention.

(6) The aged wet gel is performed with solvent replacement, wherein the solvent replacement is divided into two stage operations. With reference to FIG. 2, the first stage is to place the aged wet gel in a reaction container added with the alcohol solvent, and water content within pores of the wet gel is exchanged out through the alcohol solvent. The alcohol solvent is ethanol or isopropanol and methanol. The container having the wet gel is stirred for one to twelve hours at speed of 300 to 1000 rpm and temperature of 25 to 80 degree Celsius after adding the alcohol solvent, thereby improving replacement result. The operation of replacing water content with the alcohol solvent can be repeated for many times until the concentration of the alcohol solution reduces to a set value (For example, the set value is 5%. However, the set value, but not limited, can be adjusted.).

The second stage is that the container having the wet gel is further added with the organic solvent to exchange the alcohol solution within pores of the wet gel after replacing with the alcohol solvent. The organic solvent can be n-Hexane, acetone or cyclohexane. A volume ratio of the organic solvent and silicic acid solution is 1:1. The container having the wet gel is further stirred for one to twelve hours at speed of 300 to 1000 rpm and temperature of 25 to 80 degree Celsius after adding the organic solvent, thereby improving replacement result. An operation of replacing the alcohol solution with the organic solvent can be repeated for many times until the concentration of the organic solution is reduced to a set value (For example, the set value is 5%. However, the set value, but not limited, can be adjusted.).

(7) Surface modification is performed for the wet gel that has been performed with solvent replacement, wherein a mixed solution having siloxane modifier and an organic solvent is added into the container having the wet gel and the organic solvent that are completed with solvent replacement, and the mixed solution is stirred for one to sixteen hours at speed of 300 to 1000 rpm and temperature of 25 to 80 degree Celsius so that the wet gel is modified into hydrophobicity from original hydrophilicity. The siloxane modifier is Hexamethyldisilazane, Methyltrimethoxysilane or Tetraethyl orthosilicate, and Mole ratio of the siloxane modifier and the silicic acid is 1:0.35 to 1.67. After completing the modification, the wet gel can be separated from the solution. The solution can be recycled and further processed.

(8) The modified hydrophobic wet gel is dried by adopting atmospheric drying, and it uses 60 degree Celsius, 150 degree Celsius and 230 degree Celsius to dry one hour by way of stepped heating so as to prepare $SiO_2$ aerogels having low heat conductivity and high hydrophobicity The foregoing steps describe the preparation method for $SiO_2$ aerogels, wherein the process (solvent replacement) in the step 6 is the most important step of preparing $SiO_2$ aerogels. Therefore, the disclosure carries out improvement for the step 6 (solvent replacement) to accelerate (reducing) operating time of solvent replacement and improve effect of replacing solvent.

Figure 3:
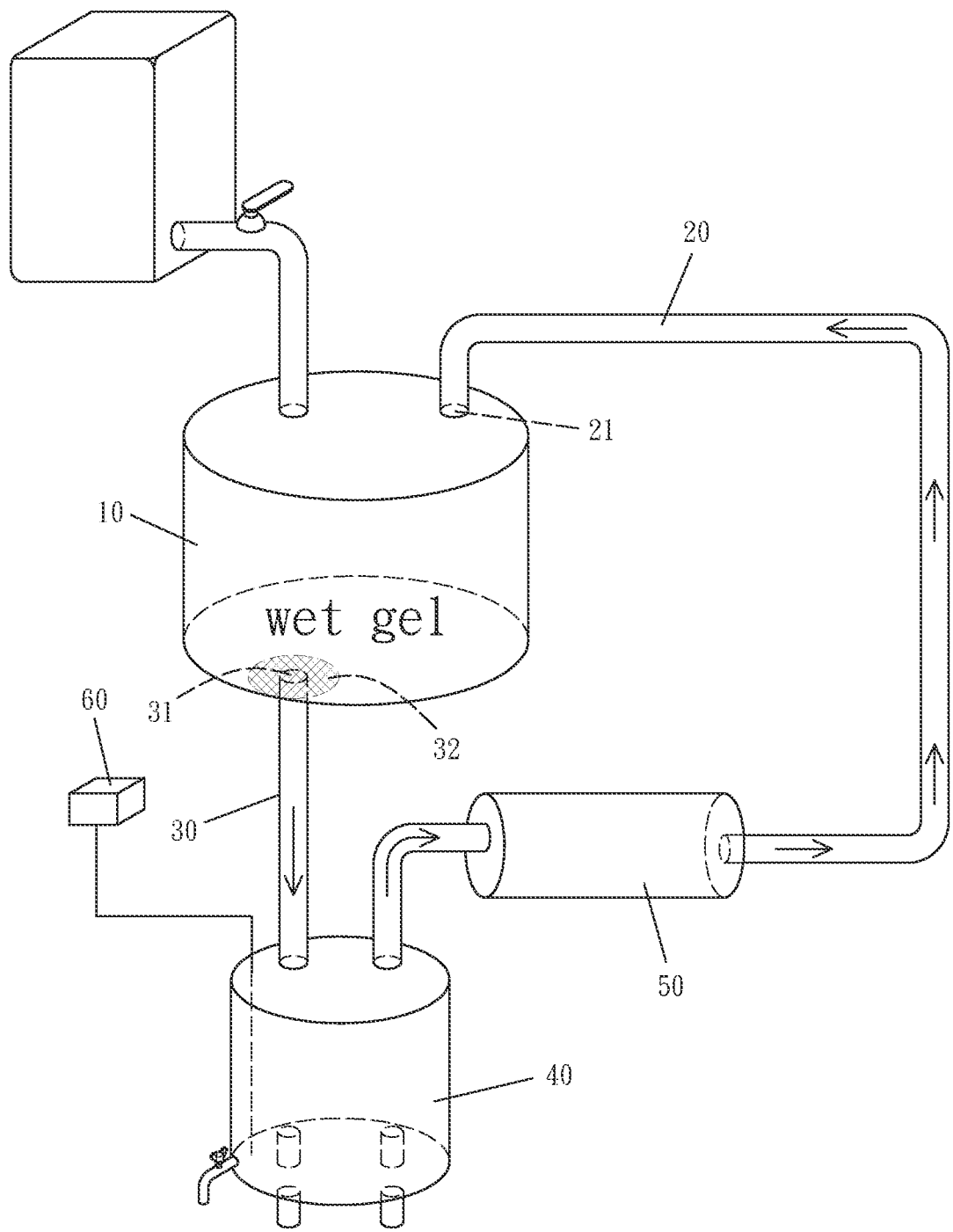
FIG. 3 is a structure schematic diagram of solvent replacement operation in the preparation method according to the invention.

With reference to FIG. 3, in the process of the step 6 (solvent replacement), an operation of conventionally adding solvent for setting (the alcohol solvent in the first stage or the organic solvent in the second stage) adopts "a manner of continuously circulation filtration". For example, a liquid inlet 21 from a liquid pipe 20 above the reaction container 10 internally containing the wet gel communicates with the reaction container 10, and a bottom of the reaction container 10 is disposed with a discharge pipe 30 via a discharge outlet 31, and the discharge outlet 31 is disposed with a filtration device for separating the wet gel from the solvent to avoid the wet gel from entering the discharge pipe 30 by passing through the discharge outlet 31. Therefore, a filtration net 32 is disposed. The discharge pipe 30 communicates with a solution storage tank 40, and a power source 50 (such as a pressurizer of motor operation) is disposed between the solution storage tank 40 and the liquid pipe 20. When the wet gel is placed in the reaction container 10 and the solvent (the alcohol solvent in the first stage or the organic solvent in the second stage) is added, an effect of sucking the discharge pipe 30, the solution storage tank 40 and pushing the liquid pipe 20 generated by the power source 50 can enable the solution to form a circulation in the reaction container 10, the discharge pipe 30, the solution storage tank 40, the power source 50 and the liquid pipe 20. The solution (the alcohol solution in the first stage or the organic solvent in the second stage) is firstly filtered by the filtration net 32 before passing through the discharge pipe 30 so that the wet gel is ensured to stay in the reaction container 10 to separate the wet gel from water content or the alcohol solution. Afterward the solution enters in the solution storage tank 40 and then enters in the reaction container 10 after passing through the power source 50 and the liquid pipe 20 through sucking. Accordingly, rapid circulation is repeated to allow the wet gel to be replaced and washed by mass solvent in short time so as to accelerate separation and remove water content (In another word, water content is taken away for the first stage) or separate and remove the alcohol solution (the alcohol solution is speedily taken away for the second stage). The way of quickly circulating the solution to enter in and out of the reaction container 10 through filtration is "the manner of continuously circulation filtration".

The foregoing operating of placing the wet gel in the reaction container 10 and adding the solvent is that the solvent is injected into the reaction container 10, and such operating may have many kinds of possibilities. The simplest way is referred to FIG. 3. A plurality of solution tanks is disposed at a height place, wherein required solvents are respectively stored, for example, an alcohol solvent or an organic solvent, and different solvents are stored in different solution tanks. Therefore, when requiring which solvent, the liquid pipe at the solution tank storing required solvent is pulled to align the reaction container 10. A liquid delivery switch is turned on to inject required solvent into the reaction container 10 so achieve operating of injecting solvent into the reaction container 10. However, this operating of injecting solvent into the reaction container 10 is a front-end operation of the disclosure and not the scope of the disclosure, and there is no need to be further narrated herein.

The solution of the solution storage tank 40 can be passed by an external detection instrument 60 to perform concentration detection. When the first stage alcohol solvent replacement is performed, the concentration of the alcohol solution within the solution storage tank 40 is detected by the detection instrument 60. When the concentration of the alcohol solution is decent to a set value (For example, the set value is 5%. However, the set value, but not limited to, can be adjusted.), the operation is stopped, and the alcohol solution is removed. The removed alcohol solution can be post-processed (separating water content from the alcohol solution) to recycle and re-use. The organic solvent is injected in the reaction container 10, and the manner of continuously circulation filtration is re-initiated. When the second stage organic solvent replacement operation is performed, the detection instrument 60 detects the concentration of the organic solution within the solution storage tank 40. When the concentration of the organic solution is decreased to a set value (For example, the set value is 5%. However, the set value, but not limited to, can be adjusted.), the operation is stopped, and the organic solution is removed too. The removed organic solution can be post-processed (separating the alcohol solution from the organic solution) to recycle and reuse.

There are diversities of possibilities in operating of discharging solution too (so as to process after recycling). The simplest way is shown in FIG. 3. A discharge pipe is disposed at a bottom of the solution storage tank 40. A recycled container is placed below the discharge pipe, or a discharge pipe is directly connected to a recycling tank. A liquid discharge switch is turned off to discharge solution within the reaction container 10 to the recycling container or the recycling barrel. However, since operation of solution post-processing and recycling and reusing is not the scope of the disclosure, there is no need to be narrated herein.

The disclosure adopts "a manner of continuously circulation" for the step 6 (solvent replacement) in the preparation method for $SiO_2$ aerogels and approves better effect after carrying out experimental trial. The table is to perform "a manner of continuously circulation filtration" for the step 6 during preparation for $SiO_2$ aerogels according to the disclosure and is a practical record obtained by changing different operation conditions. The feature of final $SiO_2$ aerogels from the table is (a) specific surface area: 649.29 to 727.79 m·supra·2/g; (b) pore volume: around 0.97 to 2.63 cm·supra·3/g; (c) pore size: around 5.80 to 14.80 nm; (d) hydrophobic angle: around 138 to 140 degree; (e) density: around 0.1150 to 0.1749 g/cm·supra·3; (f) porosity: around 92.1 to 94.8%; (g) heat transfer coefficient: around 0.0299 to 0.0432 W/mK; (h) process time is around 17 to 23 hours, thereby proving that final $SiO_2$ aerogels having good features.

The disclosure adopts "the manner of continuously circulation filtration" consistently composed of filtration procedure for the solvent passing through and enabling the solvent to quickly circulate the reaction container. Its advantages are that:

(1). The wet gel is continuously circulated and replaced (rinsing) by mass alcohol solvent and organic solvent at relative short time to greatly accelerate (reducing) the time for the operation of replacing wet gel solvent.

(2). The alcohol solution and the organic solution passing through the wet gel reaction container are used to separate the wet gel from the solution through filtration procedure to prevent the wet gel from entering the discharge pipe. Afterward the solution is pushed to enter the reaction container to perform solvent replacement for the wet gel. Accordingly, the replacement effect can be greatly improved through the continuously circulation filtration.

While the present invention has been described by means of specific embodiments, numerous modifications and variations could be made thereto by those skilled in the art without departing from the scope and spirit of the invention set forth in the claims.

What is claimed is:

1. A preparation method of $SiO_2$ aerogels, comprising the following steps: (1). Mixing an inorganic silicon source with pure water in a container to form a mixed solution; (2). hydrolyzing the mixed solution via a cation exchange resin to obtain a silicic acid solution; (3). Adding an alkaline catalyst into the silicic acid solution to obtain a wet gel; (4). Crushing the wet gel; (5). Adding an alcohol solvent into the crushed wet gel to perform aging for one to twelve hours; (6). Performing solvent replacement on the aged wet gel, wherein the solvent replacement is divided into two stage operations, wherein in the first stage, the aged wet gel is placed in a reaction container containing an alcohol solvent, and the water content within pores of the wet gel is exchanged with the alcohol solvent; and wherein in the second stage, an organic solvent is added in the reaction container having the wet gel after the first stage, so as to exchange the alcohol solvent within the pores of the wet gel with the organic solvent; (7). Carrying out surface modification of the wet gel that has undergone solvent replacement, wherein a mixed solution having a siloxane modifier and an organic solvent is added into the reaction container having the wet gel that has undergone solvent replacement so that the wet gel is modified to be hydrophobic; (8). Adopting atmospheric drying to dry the modified hydrophobic wet gel so as to prepare $SiO_2$ aerogels; characterized in that: in step (6), continuous circulation filtration is adopted for the step of adding the alcohol solvent and for the step of adding the organic solvent, wherein a liquid inlet from a liquid pipe above the reaction container containing the wet gel communicates with the reaction container, and the bottom of the reaction container is disposed with a discharge pipe via a discharge outlet, and the discharge outlet is disposed with a filtration device, and the discharge pipe communicates with a solvent storage tank, and a power source is disposed between the solvent storage tank and the liquid pipe, and the power source provides a sucking effect on the discharge pipe and a pushing effect on the liquid pipe, and proper solvent content is stored in the solvent storage tank, and with the effect of the power source, solvent is circulated in the reaction container, the discharge pipe, the solvent storage tank, the power source and the liquid pipe, and the water content (of the first stage) and the alcohol solution of the second stage contained within the wet gel is separated and removed.

2. The preparation method of SiO2 aerogels of claim 1, wherein in the step (1), a sodium silicate having 40 to 50 percent solid content is taken as the inorganic silicon source, and the modulus of diluting sodium silicate through pure water is from 2.53 to 3.33, and the solid content of the resulting mixed solution is 8 to 20 percent by weight.

3. The preparation method of $SiO_2$ aerogels of claim 1, wherein in step (2), the silicic acid solution has a pH value between 2 and 3.

4. The preparation method of $SiO_2$ aerogels of claim 1, wherein in step (3), the alkaline catalyst is ammonium hydroxide ($NH_4OH$) or sodium hydroxide (NaOH), and preferably a solution of 1M alkaline catalyst is added into the silicic acid solution until the pH value of the silicic acid solution is between 4 to 8 so as to obtain the wet gel.

5. The preparation method of $SiO_2$ aerogels of claim 1, wherein in the step (4), a crusher adopts a rotation speed of 300-1000 rpm to crush the wet gel.

6. The preparation method of $SiO_2$ aerogels of claim 1, wherein in step (5), the alcohol solvent is ethanol, isopropanol, or methanol, and the volume ratio of the added the alcohol solvent and the silicic acid solution is 1:1, and the crushed wet gel is aged for one to twelve hours at a temperature of 25 to 80 degrees Celsius.

7. The preparation method of $SiO_2$ aerogels of claim 1, wherein in step (6), the alcohol solvent is ethanol isopropanol, or methanol, and the reaction container having the wet gel is stirred for one to twelve hours at speed of 300 to 1000 rpm and at a temperature of 25 to 80 degrees Celsius after adding the alcohol solvent, and an operation of replacing water content with the alcohol solvent is repeated until the concentration of the alcohol solvent is reduced to a set value, and the organic solvent is n-Hexane, acetone or cyclohexane, and a volume ratio of the organic solvent to the silicic acid solution is 1:1, and the reaction container having the wet gel is stirred for one to twelve hours at speed of 300 to 1000 rpm and at a temperature of 25 to 80 degrees Celsius after adding organic solvent, and an operation of replacing the alcohol solvent with organic solvent is repeated until a concentration of the organic solvent is reduced to a set value.

8. The preparation method of $SiO_2$ aerogels of claim 1, wherein in step (7), the mixed solution comprising the siloxane modifier and the organic solvent is stirred for one to sixteen hours at 25 to 80 degrees Celsius and at a speed of 300 to 1000 rpm, and the siloxane modifier is Hexamethyldisilazane, Methyltrimethoxysilane or Tetraethyl orthosilicate, and the molar ratio of the siloxane modifier to the siloxane modifier is 1:0.35 to 1.67.

9. The preparation method of $SiO_2$ aerogels of claim 1, wherein in the step (8), the atmospheric drying respectively operates at 60, 150, and 230 degrees Celsius to dry the wet gel in one hour by way of stepped heating.

10. The preparation method of $SiO_2$ aerogels of claim 1, wherein an external detection instrument is placed into the solvent contained in the solvent storage tank to perform concentration detection.

* * * * *